United States Patent [19]

Yonezawa

[11] Patent Number: 4,557,371

[45] Date of Patent: Dec. 10, 1985

[54] WORK-CLAMP PALLET FOR MACHINE TOOL

[75] Inventor: Keitaro Yonezawa, Itamishi, Japan

[73] Assignee: Aioi Seiki K. K., Itamishi, Japan

[21] Appl. No.: 394,871

[22] Filed: Jul. 2, 1982

[30] Foreign Application Priority Data

Jul. 17, 1981 [JP] Japan .......................... 56-106968[U]

[51] Int. Cl.[4] ............................................ B65G 47/00
[52] U.S. Cl. .............................. 198/803.01; 294/87.1;
269/25; 198/803.3
[58] Field of Search ............... 198/345, 472, 648, 339,
198/694; 29/33 P, 563, 568; 269/25, 30, 137,
138; 414/749, 750; 294/63.1, 87.1

[56] References Cited

U.S. PATENT DOCUMENTS

| 824,394 | 6/1906 | Warner | 269/137 |
|---|---|---|---|
| 2,630,702 | 3/1953 | Pizzani | 294/87.1 |
| 2,729,126 | 1/1956 | Stanton, Jr. et al. | 269/137 |
| 3,223,405 | 12/1965 | Wilson | 269/137 |
| 3,270,897 | 9/1966 | Lingl | 294/87.1 |
| 3,406,958 | 10/1968 | Geneloni et al. | 269/137 |
| 3,473,420 | 10/1969 | Boggs | 269/138 |
| 3,658,315 | 4/1972 | Boucherie | 198/694 |
| 3,700,274 | 10/1972 | Paschal et al. | 294/63.1 |
| 3,825,245 | 7/1974 | Osburn et al. | 198/472 |
| 3,899,162 | 8/1975 | Fischer | 269/25 |
| 4,014,428 | 3/1977 | Ossbahr | 198/472 |
| 4,049,253 | 9/1977 | Mandel | 269/137 |
| 4,239,445 | 12/1980 | Ozawa | 198/345 |
| 4,257,513 | 3/1981 | Siarto | 198/345 |
| 4,275,983 | 6/1981 | Bergman | 198/345 |
| 4,345,750 | 8/1982 | Glaser | 269/138 |

Primary Examiner—Joseph E. Valenza
Assistant Examiner—Daniel R. Alexander
Attorney, Agent, or Firm—Bacon & Thomas

[57] ABSTRACT

The present invention relates to a work-clamp pallet used to clamp workpieces on a table of a machine tool to improve the working efficiency of the machine tool. This is achieved by shortening the time for exchanging workpieces on the table and for positioning workpieces on the table along both X and Y axes. A large number of workpieces are positioned on a work-clamp pallet along the Y-axis by the aid of a standard frame secured to a base block and along the X-axis by the aid of positioning stoppers projecting from the standard frame. The workpieces are clamped against the standard frame by clamping devices disposed at least on one side of the standard frame. The positioning and clamping a large number of workpieces on the base block is done outside the machine and, when the machine has stopped a machining over, a work-clamp pallet is transferred onto the table in exchange for that with finished workpieces which is removed. The work-clamp pallet can be positioned longitudinally as well as laterally with a high precision by the aid of a positioning device.

20 Claims, 43 Drawing Figures

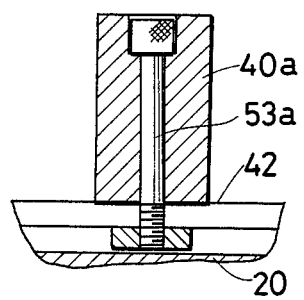
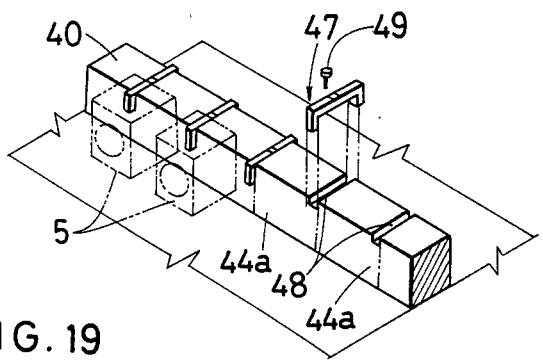
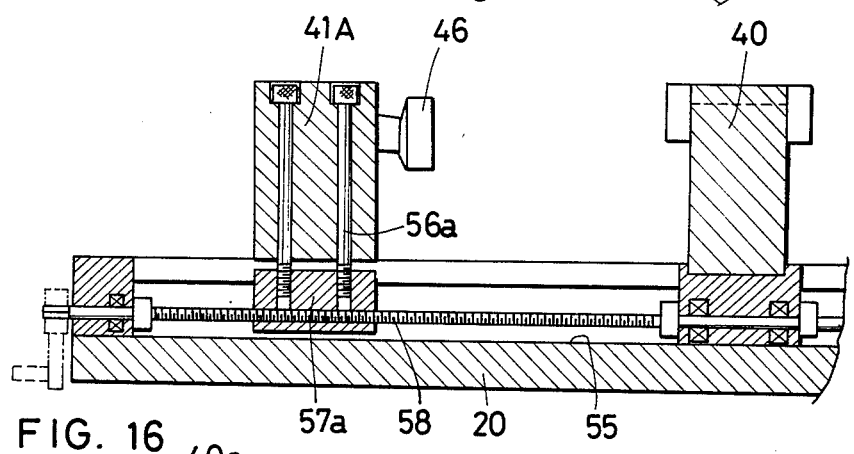
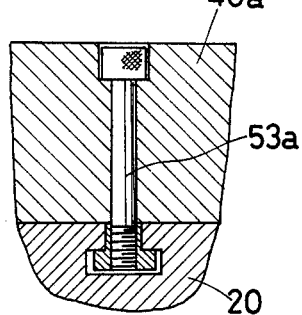
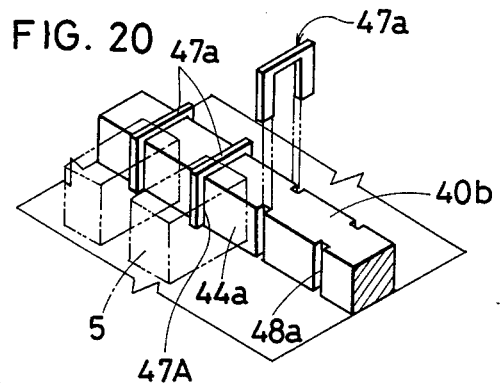
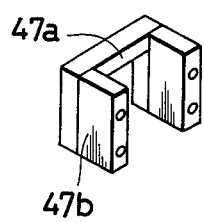
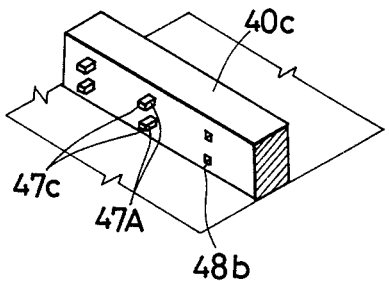

WORK-CLAMP PALLET FOR MACHINE TOOL

BACKGROUND OF THE INVENTION (1) Field of the Invention

The present invention relates to a work-clamp pallet for a machine tool which is attached to a work table to facilitate quick exchange of workpieces on the pallet for improvement of the working efficiency of the machine tool.

(2) Description of the Prior Art

The improvement of productivity of numerically controlled (NC) machine tools such as machining centers the working efficiency as well as precision has been noted in recent years However, the work-changing remains time-consuming with little improvement made to date. As a result, the proportion of the time required for changing workpieces to the overall working hours has been steadily and rapidly increasing in sharp contrast to that of actual machining time. It is accepted to be a major area for the desired improvement of working efficiency in machine tool operation.

The initial costs of machine tools have also been increasing, keeping pace with their increasing speed and production capacity.

The importance of shortening the time required for changing workpieces on the machine's work table has been recognized for the improvement of the overall working efficiency of the machine so that their high production capacity can be fully utilized.

Of the prior art, considered useful to meet this desire is, among others, the work-clamp pallet described in U.S. Pat. No. 3,899,162. (See FIG. 43.)

Its construction is as described below.

On its base block 201 are arranged 5 pairs of hydraulic cylinders 202, each pair thereof opposing each other. Between the opposing pairs of hydraulic cylinders 202 at a lower level there is provided a centering device 203. In this device 203, an upwardly tapered block 204 is guided by a pair of vertical guides 205 so as to be movable only vertically and is urged upwardly by spring 206.

The piston rod 207 of each hydraulic cylinder 202 has secured to it a positioning block 208 and above it there is fixedly disposed a clamping block 209. The front end face of the positioning block 208 forms an inclined face 210 which comes into contact with the tapered block 204.

In the topside of the clamping block 209 there is provided a recess 212 for engagin workpiece 211 therein. The rear wall face of this recess 212 serves as a clamping face 213 and both side walls thereof serve as right and left positioning faces 214, respectively.

Described below is how it is used and its functions.

First, the base block 201 is placed on the work table of the vertical machine tool and is precisely positioned longitudinally as well as laterally before it is clamped.

Then the workpiece 211 is set in the recesses 212 of each opposing pair of hydraulic cylinders 202. The width of the recess 212 is dimensioned to match that of the workpiece 211, hence the workpiece 211, as it is set in the recesses 212, comes into contact with both right and left positioning faces 214 to be laterally positioned thereby.

Then, when both hydraulic cylinders 202 are simultaneously driven, the workpiece 211 is clamped between the clamping faces 213 of both clamping blocks 209.

The inclined faces 210 of both positioning blocks 208 then come into contact with the tapered block 204 on both sides thereof and are stopped after the tapered block 204 has been forced down against the force of the spring 206.

Thus, the longitudinal position of the workpiece 211 is determind by the tapered block 204, inclined faces 210, both positioning blocks 208, both clamping blocks 209 and both clamping faces 213.

This construction, however, has the following defects or shortcomings:

(1) There is no standard for longitudinal as well as lateral positioning on the machine's work table of the base block of the pallet-clamp pallet, this resulting in a poor positioning precision.

Also, the required positioning procedure is time-consuming and inefficient;

(2) The work-clamp pallet is clamped on the work table of the machine tool as the workpieces thereon are changed.

Hence, the time required for changing workpieces increases with increasing number of workpieces involved which means increased down-time of the machine tool for work-changing and decreased working efficiency thereof;

(3) For precise lateral positioning of workpieces 211, it is necessary to precisely dimension the width of the recess 212 of the clamping block 209 to match that of the workpiece 211 so as to ensure perfect fitting of both.

This means that a different clamping block 209 must be used each time the width of the work 211 is changed.

This means an increased down-time required for changing clamping blocks 209, which is added to the already long work-changing time, further lowering the working efficiency.

Moreover, it is quite expensive and troublesome, for a large number of different size clamping blocks 209 have to be made and kept according to the variety in width of the workpieces involved;

(4) At least two units of hydraulic cylinders 202 are required to clamp one workpiece 211, making the construction of the pallet complicated and being also expensive.

It also means an increased space required for the hydraulic cylinders 202 with the corresponding decrease of the space available for workpieces, hence the number of workpieces that can be placed on the work table of the machine tool is decreased. The required frequency of work-changing is increased and the efficiency of work-changing is affected, these resulting in deterioration of the overall working efficiency of the machine tool; and (5) For positioning the workpiece 211 only longitudinally, the positioning device 203 and the positioning block 208 are required, hence the construction of the work-clamping pallet is unduly complicated, this resulting in a further increase of its manufacturing cost.

Since both positioning device 203 and positioning block 208 are moving parts, there is an increased risk of error in longitudinal positioning of the work 211, this resulting in a lowered precision of longitudinal machining.

This defect is bound to be aggravated with progressive wear of the moving parts, hence there is much to be desired about its durability.

SUMMARY OF THE INVENTION

The present invention eliminates all of the defects or shortcomings of the quoted prior art enumerated above in (1)–(5).

A primary object of the present invention is to shorten the time required for changing workpieces on the work table of a machine tool to thereby reduce the down-time of the machine tool and increase the machine's overall working efficiency.

The present invention involves a work-clamp pallet of a construction, wherein a large number of workpieces can be positioned along the X-axis as well as the Y-axis with a high precision before they are clamped in place on the work-clamp pallet. Also, the work-clamp pallet itself can be readily and precisely positioned on the work table.

The work-clamp pallet of the present invention is composed of a base block, a standard frame and a plurality of clamping devices described below in detail.

The base block is provided with a positioning means for positioning it on the work table longitudinally as well as laterally, a fixing means for clamping it to the said work table and a work clamping face for clamping workpieces thereon.

The standard frame is attached to an upper, work clamping face of the base block along its X-axis. Of the two sides of this standard frame, at least one has defined on it unit work positioning faces at a proper pitch along the X-axis. At one end along the X-axis of each unit work positioning face there is provided a projecting positioning stopper for positioning the work along the X-axis.

Hence, with this work-clamp pallet, a large number of workpieces can be positioned on the work-clamping face of the base block readily and precisely by simply bringing each thereof into contact with each unit work positioning face of the standard frame and the corresponding positioning stopper along the X- as well as Y-axis.

On the work clamping face of the base block each clamping device is disposed across a work accommodating space from each unit work positioning face of the standard frame. Each clamping device is composed of a clamping unit proper, a clamping block and a driving means. Clamping unit proper is guided by a guiding means to be displaceable on the work clamping face in a direction along the Y-axis and is provided also with a fixing means to be fixed in place thereby. The driving means is supported by the clamping unit proper and drives the clamping block toward or away from the unit work positioning face.

Each workpiece positioned along the X- as well as Y-axis on the work clamping face of the base block can thus be clamped by the clamping block of each clamping device against the corresponding unit positioning face of the standard frame.

At least two work-clamp pallets of the invention decribed above are provided for alternate use on the work table of machine tool.

First, on one of the two pallets a large number of workpieces are clamped and the loaded work-clamp pallet is transferred onto the work table of machine tool and, after positioning longitudinally as well as laterally by the provided positioning means is clamped to the table by the clamping system also provided. Now the workpieces on the pallet are ready for machining.

Meanwhile, i.e. while the machine tool is at work, another large number of workpieces are positioned and clamped on the other pallet in a work changing station for the next cycle of machining.

When the machining on the workpieces set on the former work-clamp pallet is over, the other pallet ready with a large number of new parts is transferred onto the work table in exchange for the finished pallet.

Thus, a single exchange of work-clamp pallets suffices for the supposedly troublesome work of positioning a large number of workpieces along the X as well as the Y-axis precisely and subsequently clamping them.

A second object of the present invention is to simplify the work of positioning workpieces along the X as well as the Y-axis of the work table with increased readiness and improved precision to thereby improve the precision as well as the overall machining efficiency.

According to the present invention, workpieces can be positioned along the X as well as the Y-axis on the base block of the pallet with a high precision by simply bringing each of them into contact with both the work positioning face and the positioning stopper. The base block of the pallet itself with its positioning system can be readily and precisely positioned on the work table longitudinally as well as laterally. Hence, by the aid of the work-clamp pallet of the invention with its positioning system, base block, work clamping face and positioning stopper, positioning of a large number of workpieces on the work table can be done readily with a high precision along its X as well as Y-axis.

A third object of the present invention is to reduce the space occupied by the work-clamping system to thereby increase the space available for the workpieces. Increasing the number of workpieces which can be readied for machining at a time, reduces the freqency of work-changing on the base block for the desired improvement of work-changing efficiency, and also for reduces the frequency of changing work-clamp pallets on the work table for the desired improvement of the overall working efficiency of the machine tool.

While in the quoted prior art two hydraulic cylinders are required for clamping a single piece of work, in the pallet construction of the present invention only one clamping device, which is equivalent to a hydraulic cylinder, is used and the standard frame is provided in place of the other of hydraulic cylinder in the prior art. Compared with the hydraulic cylinder, the standard frame is much simpler in both construction and configuration, also being much more compact, hence reducing the space occupied by the work-clamping system or equipment with resulting increase of the space on the base block available for workpieces.

A fourth object of the present invention is to reduce the cost of manufacturing the work-clamp pallet by simplifying the construction of the equipment required for clamping workpieces on the base block as well as of the equipment required for positioning workpieces on the work clamping face of the base block along the X as well as the Y-axis. This makes the pallet more compact, and at the same time to improve the precision of machining workpieces, and reduces the risk of pallets getting loose due to wear and to improve the durability thereof.

According to the present invention, the construction as well as configuration of the equipment required for clamping workpieces can be made simpler by the use of the said standard frame instead of said other set of hydraulic cylinder in the quoted prior art, also sizably reducing the size of the work-clamp pallet.

Also simplified to a large extent is the construction of the equipment required for positioning workpieces on the work-clamping face of the base block along the X as well as Y-axis. In the absence of the positioning device with its tapered block, positioning blocks and clamping blocks with the said combined recess of known complexity taught by the prior art, the said equipment composed of only the work positioning face of the standard frame and the positioning stoppers thereon.

Moreovoer, the said standard frame, work positioning face and positioning stoppers are all stationary components which eliminates the risk of the precision of machining works being affected by increased clearances between moving parts due to progressive wear.

Further, when the clamping devices are disposed symmetrically on both sides of the standard frame so that the unit work positioning faces on both sides of the standard frame are subjected to opposing forces, the standard frame is required to withstand only the resulting simple compression. Hence, it is possible to reduce its thickness along the Y-axis with resultant increase of the space available for works.

A fifth object of the present invention is to enable clamping workpieces of different width easily and precisely without replacing the clamping block as in the case with the prior art and without any risk of work-positioning error in the direction of the X-axis. This eliminates the defects of the prior art stemming from the necessity of replacing the clamping block each time the width of the work is changed, and prolonging of the work-changing time with the resultant lowering of the work-changing efficiency and the overall working efficiency of the machine tool. Also eliminated is the increased cost due to the necessity of making many clamping blocks of different width of the work-engaging recess and increased care required for keeping them.

According to the present invention, the work is positioned only at one end therof along the X-axis by a single positioning stopper with the other end free. Hence precise positioning by the same positioning stopper along the X-axis is feasible even if the work's width, i.e. its dimension along the X-axis, is changed within reason, and the positioned work can be clamped by the same clamping block.

BRIEF DESCRIPTION OF THE DRAWINGS

FIGS. 1–42 relate to the embodiments of the present invention, while

FIGS. 1–29 deal with the principal embodiment, while FIGS. 30–42 show alternative embodiments relating to the first to 9th alternative embodiments.

FIG. 1 is a plan view of a vertical machine tool and a pallet-changing table of the present invention.

FIG. 2 is a side view of that shown in FIG. 1.

FIG. 3 is a vertical sectional side view partially showing a travelling gear of a work-clamp pallet.

FIG. 4 is a vertical sectional view of an auxiliary table taken along the line IV—IV in FIG. 1.

FIG. 5 is a vertical sectional view of the auxiliary table taken along the line V—V in FIG. 1.

FIG. 6 is a vertical sectional front view showing a part of a clamping device and the travelling gear.

FIG. 7 is a vertical sectional front view showing a part of the travelling gear.

FIG. 8 is a vertical sectional front view of a pallet bed and a guide rail.

FIG. 9 is a vertical sectional front view of a positioning device.

FIG. 10 is a pneumatic/hydraulic system chart of the positioning device and clamping device.

FIG. 11 is a perspective view of the work-clamp pallet and the auxiliary table.

FIG. 12 is a plan view of the work-clamp pallet.

FIG. 13 is a front view of the work-clamp pallet.

FIG. 14 is an enlarged vertical sectional side view of essential parts of the work-clamp pallet.

FIG. 15 is a vertical sectional side view of a modified standard frame.

FIG. 16 is a vertical sectional front view showing a part of the standard frame in FIG. 15.

FIG. 17 is a partial perspective view of the standard frame.

FIG. 18 is a pneumatic/hydraulic system chart of the clamping device and hydraulic pressure supply device of the work-clamp pallet.

FIG. 19 is a vertical sectional side view showing a part of a push-pull means for a clamp frame relating to a modified work-clamp pallet.

FIG. 20 is a partial perspective view of a modified standard frame.

FIG. 21 is a perspective view of a modified positioning stopper.

FIG. 22 is a partial plan view of the work-clamp pallet showing the way it is used with an auxiliary clamping block and/or auxiliary stopper.

FIG. 23 is a partial perspective view of a modified standard frame.

FIG. 24 is a partial plan view of the work-clamp pallet showing the way it is used with a rotation checking plate.

FIG. 25 is a partial vertical sectional side view of the work-clamp pallet showing the way it is used with the auxiliary clamping block.

FIG. 26 is a partial plan view of the work-clamp pallet showing the way it is used with a work retainer.

FIG. 27 is a partial perspective view of the work retainer of FIG. 26.

FIG. 28 is a partial vertical sectional side view of essential parts of the work-clamp pallet showing the way it is used with a flat work retainer.

FIG. 29 is a partial front view of a holding plate of the flat work retainer.

FIGS. 30–32 relate to a first alternative embodiment, of which:

FIG. 30 is an enlarged vertical sectional side view of essential parts of the work-clamp pallet.

FIG. 31 is an illustration showing the loading conditions of the standard frame.

FIG. 32 is another illustration showing the loading conditions of the standard frame when it is not backed up.

FIG. 33 is a partial enlarged vertical sectional side view of the clamping device in a second alternative embodiment.

FIG. 34 is a partial enlarged vertical sectional side view of the clamping device in a third alternative embodiment.

FIG. 35 is a partial enlarged vertical sectional side view of the clamping device in a fourth alternative embodiment.

FIG. 36 is a partial enlarged vertical sectional side view of the clamping device in a fifth alternative embodiment.

FIG. 37 is a partial enlarged vertical sectional side view of the clamping device in a sixth alternative embodiment.

FIG. 38 is a partial enlarged vertical sectional side view of the clamping device in a seventh alternative embodiment.

FIGS. 39 and 40 relates to an eighth alternative embodiment, of which:

FIG. 39 is a partial enlarged vertical sectional side view of the clamping device.

FIG. 40 is a sectional view taken along the line A—A in FIG. 39.

FIGS. 41 and 42 relates to a ninth alternative embodiment, of which:

FIG. 41 is a perspective view of the work-clamp pallet of a horizontal machine tool.

FIG. 42 is a front view of that shown in FIG. 41.

FIG. 43 is vertical sectional side view of the clamping device of the work-clamp pallet of fixed type shown in the quoted prior art.

DESCRIPTION OF THE PREFERRED EMBODIMENTS

Referring to FIGS. 1-28, described below is the preferred embodiment of the present invention.

Figure 1:
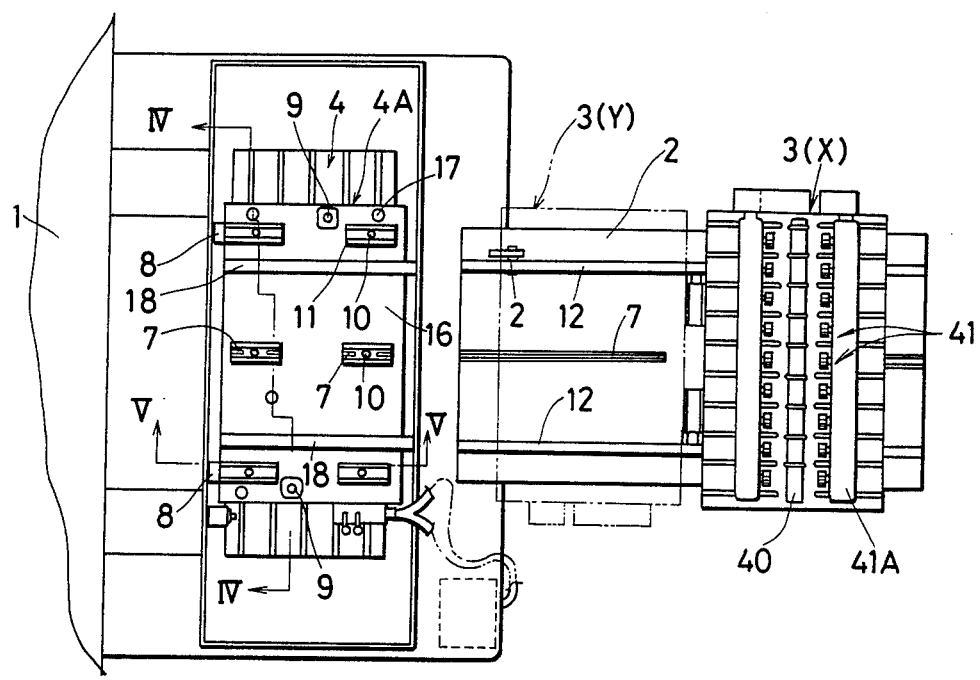
Figure 2:
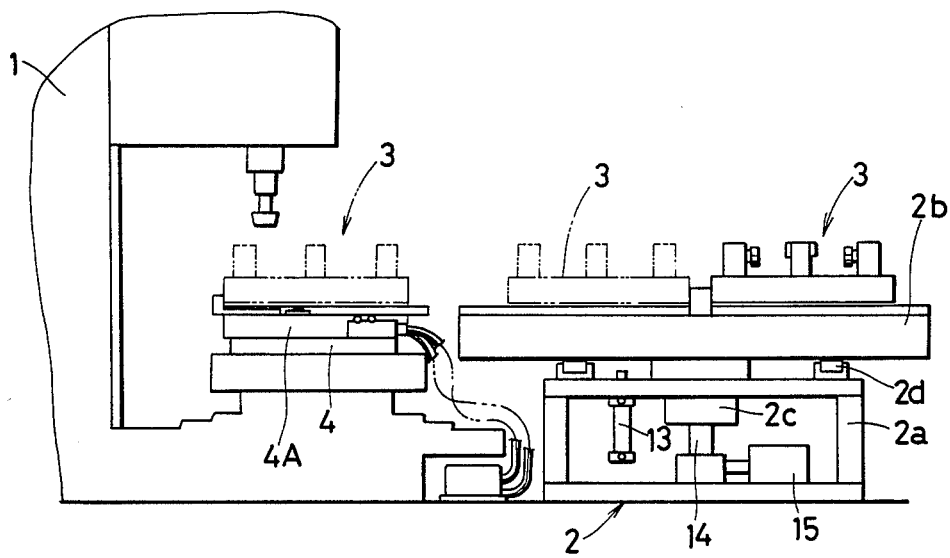

As shown in FIGS. 1 and 2, an NC (numerically controlled) vertical machine tool 1 has provided in front of it a rotary pallet changing table 2 with spaces on it for two work-clamp pallets. The machine tool 1 has fixedly secured on its movable table 4 an auxiliary table 4A for positioning and clamping the work clamp pallet 3 thereon and the work-clamp pallets 3 are exchangeable between the pallet changing table 2 and the auxiliary table 4A.

At a work changing station X on the pallet changing table 2 a large number of workpieces 5 are positioned with a high precision on one of the work-clamp pallets and are clamped in place by a clamping device 41. The pallet changing table 2 is rotated horizontally by half a turn (180°) to bring the work-clamp pallet 3 to a work-clamp pallet changing station Y.

Then the work-clamp pallet 3 is transferred from the work-clamp pallet changing station Y onto the auxiliary table 4A being guided by a guide means 7. After being stopped thereon by a stopper 8, it is positioned by a pair of positioning devices 9 and securely clamped on a pallet bed 11 of the auxiliary table 4A by hydraulic clamping means 10.

Thus, by positioning the individual workpieces on the work-clamp pallet 3 and this with respect to the table 4 with a high precision, the individual workpieces 5 can be positioned with respect to the table 4 with an equally high precision.

With the work-clamp pallet 3 thus clamped securely to the auxiliary table 4A, the cycle of machine tool 1 is started.

While the machining is under way, workpieces 5 are set on the other work-clamp pallet 3 at the work changing station X.

Upon completion of one cycle of machining, the work-clamp pallet 3 on the auxiliary table 4A is transferred onto the work-clamp pallet changing station Y, and the pallet changing table 2 is again rotated by half a turn (180°) to shift the work-clamp pallet 3 with the finished workpieces 5 to the work changing station X with simultaneous shifting of the work-clamp pallet 3 with unfinished workpieces 5 to the work changing station Y. The above procedure is repeated for successive exchange of the work-clamp pallets 3.

The pallet changing table 2 has arranged on its base frame 2a a rotary frame 26 to be horizontally rotatable on castors 2d with a shaft 2c as the center. On the top plate of the rotary frame 2b are arranged two travelling rails 12 and one guide rail 7. Reference numeral 2e denotes a stopper, 13 a rotation locking means, 14 a rotary shaft and 15 an electric motor to be provided as necessary.

The auxiliary table 4A is constructed as a unit with various devices and means arranged on its rectangular baseplate 16, and is secured with bolts 17 on the table 4

Thus, the top plate 16 has arranged thereon two, left and right, travelling rails 18, a pair of positioning means 9 on both sides thereof and as remote as possible therefrom, clamping means 10 in pairs, 2 pairs each on the left and right sides and one at the center. Pallet beds 11 disposed on both, left and right, sides of each clamping means 10, guide rails 7 extending before and after each central clamping means 10 and a pair of left and right stoppers 8 etc.

Figure 3:
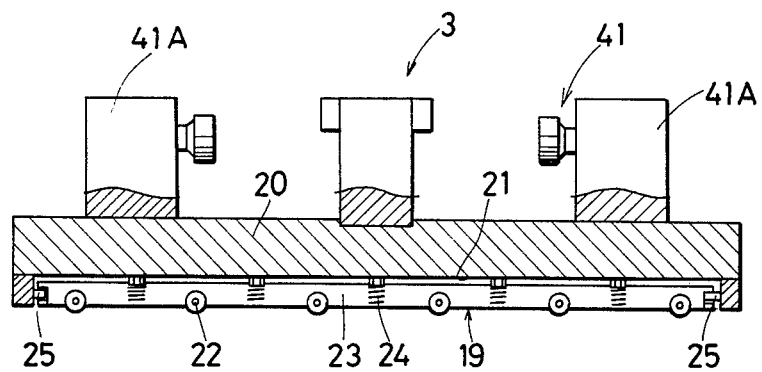
Figure 4:
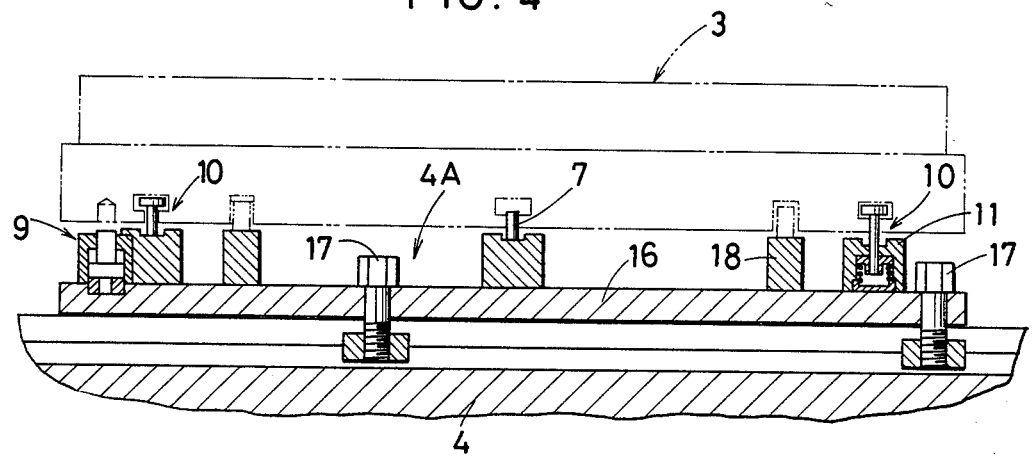
Figure 5:
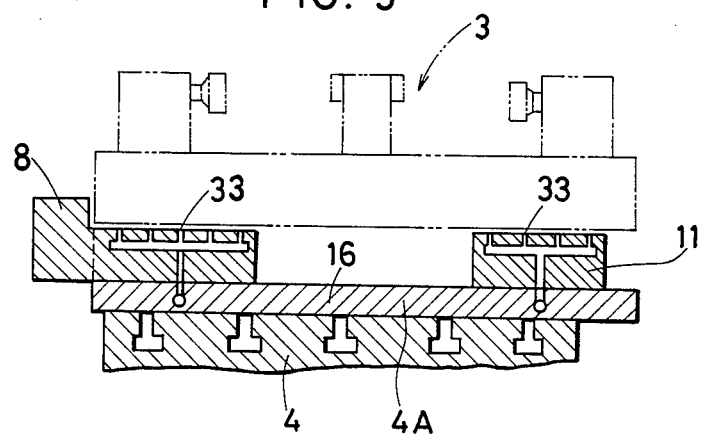
Figure 6:
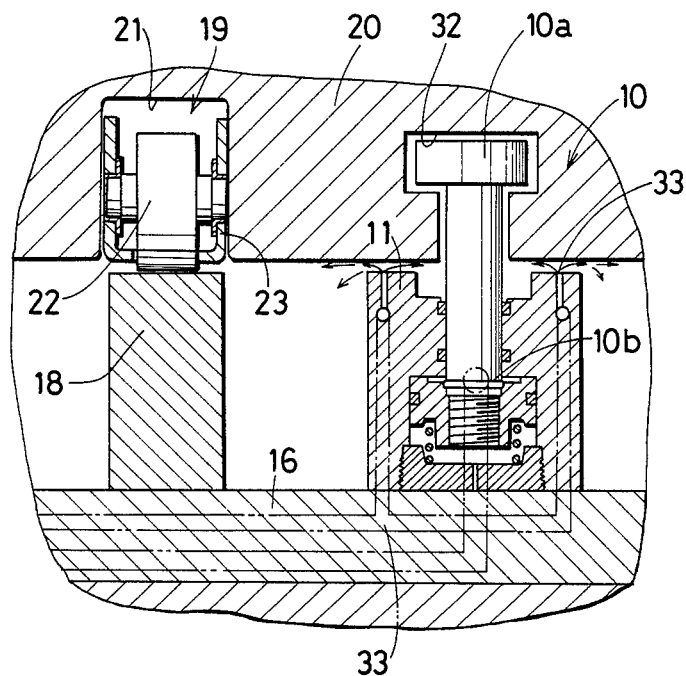
Figure 7:
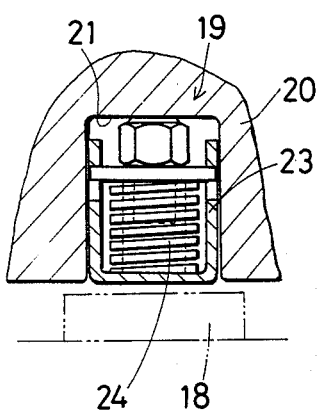

As seen from FIGS. 3-9, there are provided as travelling gears 19 for the work-clamp pallet 3 U-sectioned frame 23 each carrying casters 22, which frames 23 are set freely adjustable vertically in square-sectioned grooves 21 formed in the underside of the pallet's base block 20. The said U-sectioned frame 23 is urged downwardly by a compression spring 24 so that the tread part of each castor 22 only is projected beyond the lower edge of the frame 23, which is held by the holders 25 at both ends thereof. (FIGS. 3, 6 and 7)

Figure 9:
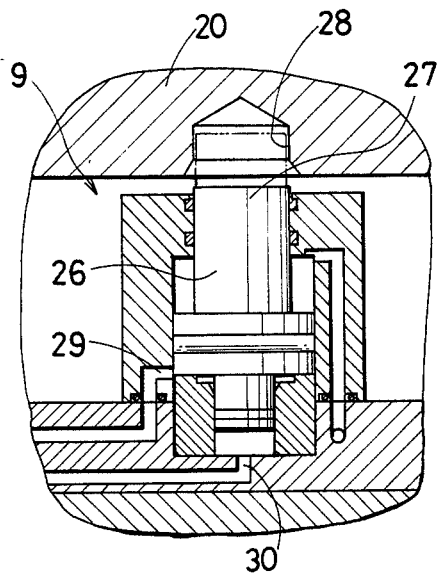
Figure 8:
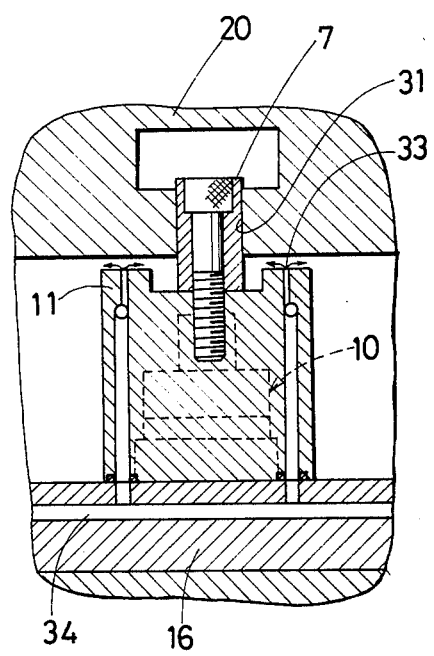

As shown in FIG. 9, the positioning device 9 consists of an air cylinder and is capable of positioning the base block 20 with a high precision with a plug 27 being the front end portion of its piston rod 26 fitted into a mating hole 28 in the underside thereof. When the pneumatic pressure is supplied through the working side port 29 for the plug 27 to be fitted into the mating holes 28, the working side port 29 communicates with a detection side port 30 for the pneumatic pressure to be supplied to the detection side port 30 and fitting of the plug 27 (in the mating hole 28) is thereby indicated as will be described below in detail.

As mentioned above, as the work-clamp pallet 3 is shifted from the work-clamp pallet exchange station Y onto the auxiliary table 4A, the guide rails 7 fit in the guide groove 31 in the underside of the base block 20 for relative sliding therein and the base block 20 is guided thereby to be free from sideway shifting. Further, each clamp arm 10a does relative movement in the fixing means 32 formed as a T-sectioned groove in the underside of the base block 20. After positioning of the base block 20 by the positioning device 9, hydraulic oil is supplied to a hydraulic oil chamber 10b of the clamping device 10 for pulling down the clamp arm 10a and with the resulting compression of the compression spring 24 of the travelling device 19 the tread of each castor 22 is retracted to be flush with the underside of the base block 20 and the base block 20 is thereupon clamped on the pallet bed 11.

At this moment compressed air is caused to exit from air outlets 33 in the topside of each pallet bed 11 to blow off any foreign object on the pallet bed 11 and at the same time allows confirmation of close contact of the underside of the base block 20 with the topside of the pallet bed 11 through detection in the rise of the pneumatic pressure in the said compressed air supply channel 34.

Figure 10:
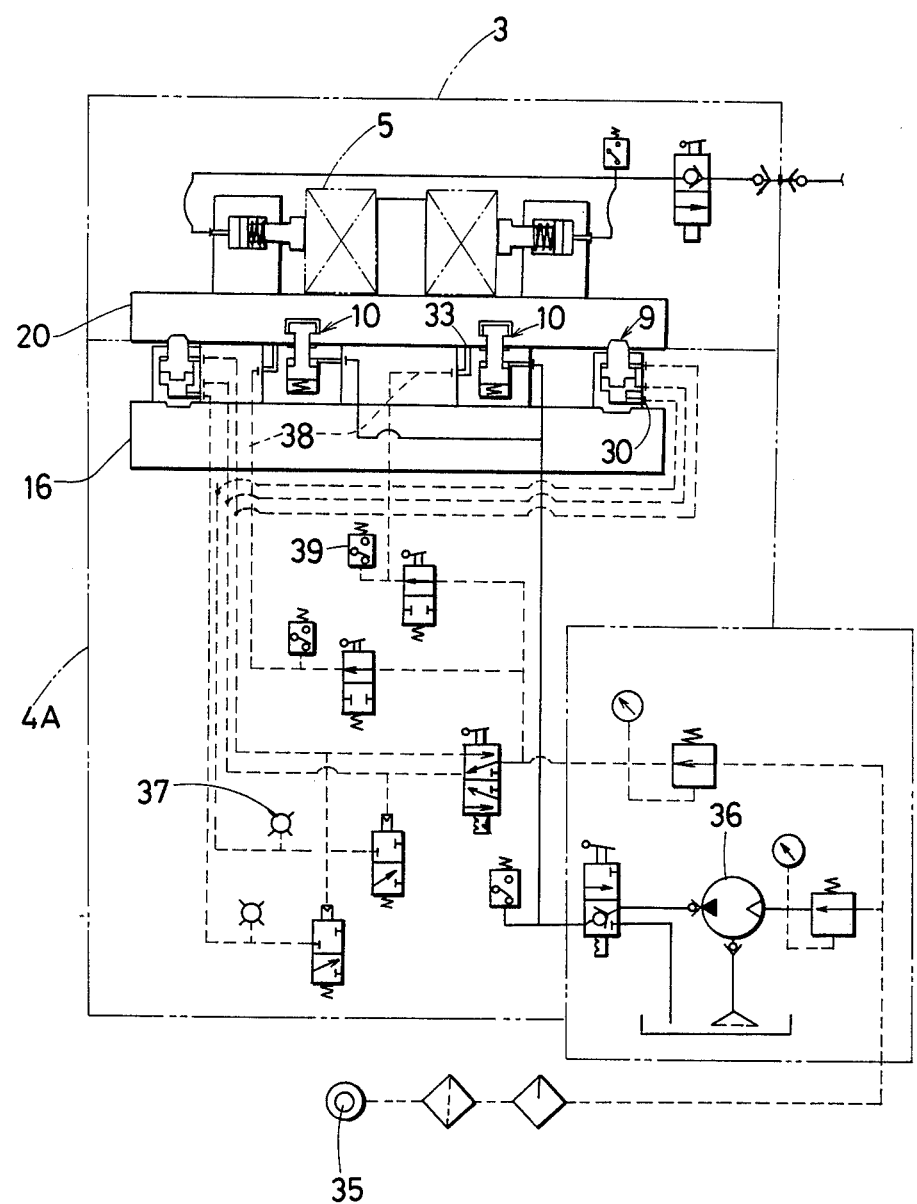

In FIG. 10 is shown in hydraulic/pneumatic circuitry for the devices in/on the said auxiliary table 4A.

Compressed air is supplied from a compressed air source 35 to a pneumatically driven hydraulic pump 36 to generate a hydraulic pressure to be supplied to the clamping device 10. At the same time the compressed air is led to the positioning device 9 and the air outlets 33 of each pallet bed 11.

It is so arranged that when the plug 27 of the said positioning device 9 is engaged in the mating hole 28, the compressed air is led to the detection-side port 30 for a pneumatic pressure pilot lamp 37 to be lit thereby.

Since the pneumatic pressure in a compressed air supply channel 38 rises when the base block 20 comes into close contact with the pallet bed 11 underneath, the condition is detected by a pressure switch 39 and the resulting signal is transmitted to light the close contact confirmation lamp (not shown).

Now referring to FIGS. 11–29, described in detail is the work-clamp pallet.

The work-clamp pallet 3 is intended for the vertical machine tool 1 and is composed of the base block 20, standard frame 40 and a plurality of clamping devices 41.

The base block 20 is an oblong thick steel plate with its lateral sides longer and its topside forming a flat work-clamping face 42.

Figure 11:
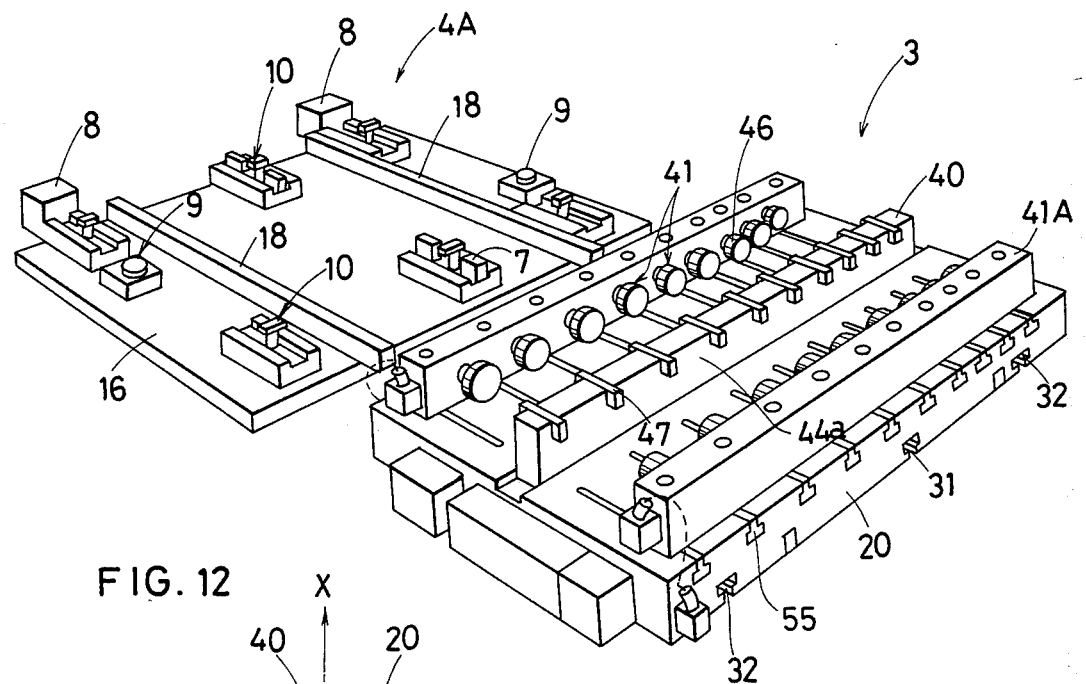
Figure 12:
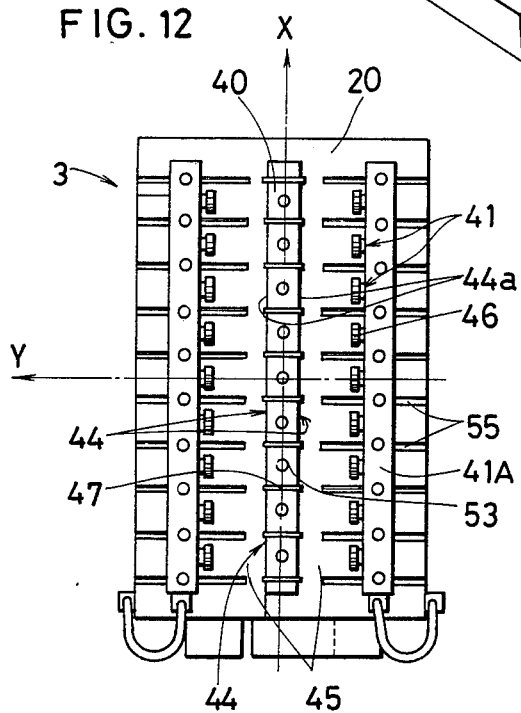
Figure 13:
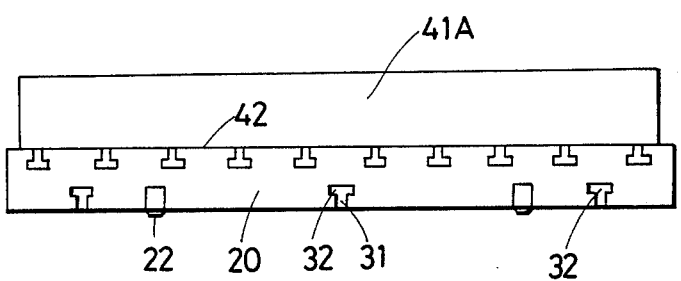

As shown in FIGS. 11 and 12, the X axis is taken laterally, the Y axis longitudinally and the Z axis vertically with the center of the work-clamping face 42 of the base block 20 as the point of origin.

The standard frame 40 is made of a square-sectioned steel bar and is secured to the work-clamping face 42 with 9 fixing bolts 53 along the X axis.

This standard frame 40 has its two sides each forming one work-positioning face 44. Parallel to each work-positioning face 44 across a work accommodating space 45 there is provided a clamp frame 41A secured to the work clamping face 42 slidable longitudinally, i.e. along the Y-axis. Each clamp frame 41A is provided with 9 clamping device spaced at an equal pitch so that each workpiece 5 can be clamped by each clamping block 46 against the work positioning face 44.

In order that a large number of like workpieces 5 can be positioned at an equal pitch on the work clamping face 42 quickly and can be clamped by the clamping devices 41 against the work positioning face 44, each work positioning face 44 is equally divided into 9 sections or unit work positioning faces 44a. At the same time for positioning of each work along the X-axis there is provided a positioning stopper 47 at one end of each unit work positioning face 44a to project beyond the unit work positioning face 44a.

As shown in FIG. 17, the said positioning stopper 47 is U-shaped and removably fitted from above in the stopper accommodating groove 48 in the topside of the standard frame 40 and, if necessary, secured in place, i.e. in the said groove, by means of a screw 49.

As a large number of workpieces 5 are positioned and clamped on the base block 20, positioning of each workpiece 5 along the X as well as the Y-axis can be done efficiently with ease by bringing one side of each workpiece 5 into contact with the corresponding unit work positioning face 44a and at the same time by bringing another side against the X-axis (e.g. the righthand side) thereof into contact with the corresponding positioning stopper 47.

The position of each workpiece 5 along the Z-axis is determined by means of a height adjuster 50 secured to the work clamping face 42 in the work accommodating space 45. (See FIG. 14.)

When the workpiece 5 to be clamped is longer than the unit work clamping face 44a, it may be positioned along and extending over a plurality of unit work positioning faces, if necessary, with a proper number of positioning stoppers 47 removed, and may be clamped by the use of the corresponding number of clamping devices 41.

Thus, small workpieces 5 as well as larger and longer ones with their length extending over the entire width of the base block 20 can be accurately positioned and clamped.

When, as mentioned above, the clamp frames 41A are arranged on both sides of and parallel to the standard frame 40, the standard frame 40 is then subjected to only compressive forces in the direction of the Y-axis, hence its loading conditions are largely eased in contrast to when the workpieces 5 are clamped only on one side of the standard frame 40. Hence, the standard frame 40 then be designed thinner in the direction of the Y-axis and the work-accomodating spaces 45 can thus be increased.

Figure 14:
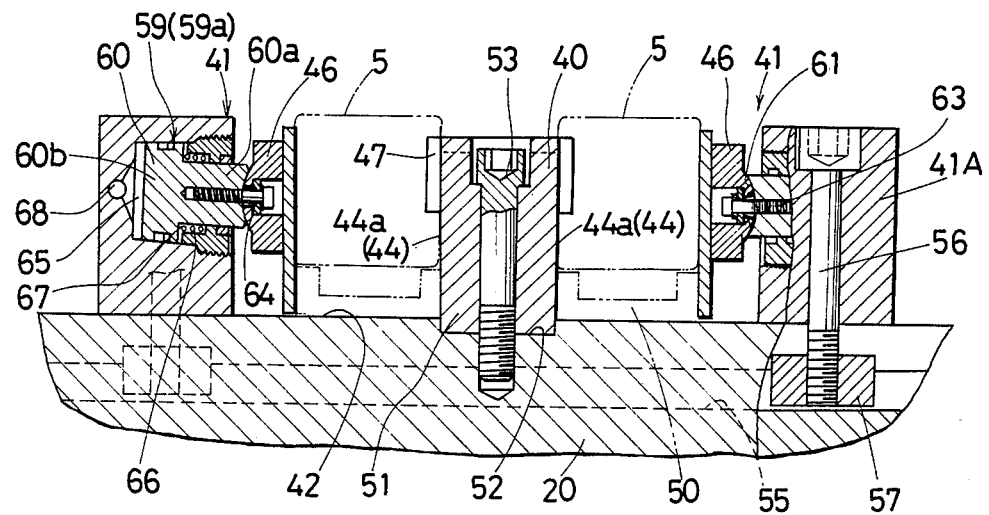

As the work-clamp pallet 3 is used repeatedly, it is possible that workpieces 5 are set by mistake assymmetrically on both sides of the standard frame 40 to ensure against deformation or twisting of the standard frame 40 even in such a case, it is advisable to have the standard frame 40 secured to the base block as shown in FIG. 14.

For this purpose, a mating recess or groove 52 may be made in the work clamping face 42 along the X-axis for engaging therein the bottom portion 51 of the standard frame 40 which may then be disengageably secured to the base block 20 by means of fixing bolts 53.

When the standard frame 40 is thus disengageably secured to the work clamping face 42, it is also possible to shift the standard frame 40 to either side of the base block 20 for clamping of larger, wider workpieces 5.

When, however, it is intended for clamping of relatively small workpieces 5 only, the standard frame 40 may as well be unremovably secured to the base block 20 by e.g. welding.

When, on the other hand, it is intended for clamping of large and wide workpieces 5 only, the standard frame 40 may be likewise unremovably secured to the base block 20 displaced toward either side thereof. In such a case, however, the standard frame 40 must be designed to be sufficiently solid for, with the clamping devices 41 disposed only on one side of it, it is bound to be subjected to more severe loading conditions.

As shown in FIGS. 15 and 16, a standard frame 40a may as well be secured to the work clamping face 42 by means of fixing bolts 53a with its position freely adjustable along the Y-axis.

Referring now to FIGS. 11, 12, 14, 18 and 19, the clamping device 41 is described in detail.

The clamping device 41 may be of any design if it is capable of clamping each workpiece 5 against the work positioning face 44 of the standard frame 40, and each clamping unit proper may be provided independently, but in this embodiment the clamping units proper of the clamping devices 41 are connected and housed as a single clamp frame 41A.

In this preferred embodiment each clamp frame 41A is disposed on the work clamping face 42 on both sides of and parallel to the said standard frame 40 along the X-axis across the work accommodating space 45. Since the width of the work accommodating space 45 is to be adjusted according to the size of the workpiece 5, each clamp frame 41A is secured to the work clamping face 42 by means of fixing means 55.56.57 with its position freely adjustable along the Y-axis as described below.

As seen from FIG. 12, the work clamping face 42 has provided in it 10 T-sectioned grooves 55 parallel to the Y axis extending from both front and rear edges thereof to near the standard frame 40 at an equal pitch, these serving as guide means.

Each clamp frame 41A is secured to the work clamping face 42 at the T-sectioned grooves 55 by screwing each fixing bolt 56, the lower end portion thereof, into the mating T-nut 57 disposed in each T-groove 55 to be freely slidable.

For adjustment of the position of the said clamp frame 41A, the clamp frame 41A is to be shifted to the desired position manually with the said fixing bolts loosened and, then, the fixing bolts 56 are to be retightened.

As shown in FIG. 19, a longitudinally shifting means may be provided for the clamp frame 41A, this consisting of a screw rod 58 set through the T-nut 57a so that the latter moves fore and back in the T-groove 55 as the former is turned.

Further, in the case of a large clamp frame 41A of a large work-clamp pallet 3, a hydraulic cylinder may be used instead of the said screw rod 58 as the longitudinally shifting means for the T-nut 57a or the clamp frame 41A itself.

The clamping block 46 of each clamping device 41 is disposed opposite to the corresponding unit work positioning face 44a and is driven fore and back by a clamping means 59.

As the clamping means 59 there is provided in this preferred embodiment a single-acting hydraulic cylinder 59a of restitution spring type housed laterally in the clamp frame 41A and to the tip of its piston rod 60a as its output member 60 is connected the clamping block 46.

Preferably this clamping block 46 may be connected to the output member 60 with a universal joint.

The back of each clamping block 46 may be formed as a partly spherical contact face 62 and this may be brought into contact with the tip of the piston rod 60a formed as a spherical seat 61 and a connecting bolt 63 may be used to connect them.

To ensure against ingression of chips into a possible gap between the partly spherical contact face 62 and the spherical seat 61, an annular elastic body 64 is inserted between the head of the connecting bolt 63 and the clamping block 46 for urging the latter toward the piston rod 60a.

The elastic body 64 may preferably comprise a rubber "0"-ring, a compression spring or the like.

To ensure against lifting of the work 5 and press it securely against the work clamping face 42, the hydraulic cylinder 59a is set with its axis inclined so that its piston rod 60a is inclined downwardly toward its tip by approx. 4° for a downward component of clamping force to be produced.

When hydraulic oil is let into a forward-stroke oil chamber 65 of the hydraulic cylinder 59a, the piston 60b is driven toward the claming direction, and when this oil chamber 65 is released of hydraulic pressure, the piston 60b is caused to return by the urge of a spring 67 loaded in a return-stroke chamber 66.

The forward-stroke oil chambers 65 of the individual clamping devices 41 are communicated by the oil channel 68 provided in the clamp frame 41A and the hydraulic pressure is supplied by a hydraulic pressure supply device 70 described below.

After clamping a plurality of workpieces 5 on the work-clamp pallet 3 placed on the pallet changing table 2, by means of the said hydraulic clamping devices 41, the work-clamp pallet 3 is transferred onto the movable table 4 of the machine tool 1, with the oil channel 68 closed by a shut-off valve 69 at the end of it to disconnect from the hydraulic pressure supply source 70.

Figure 18:
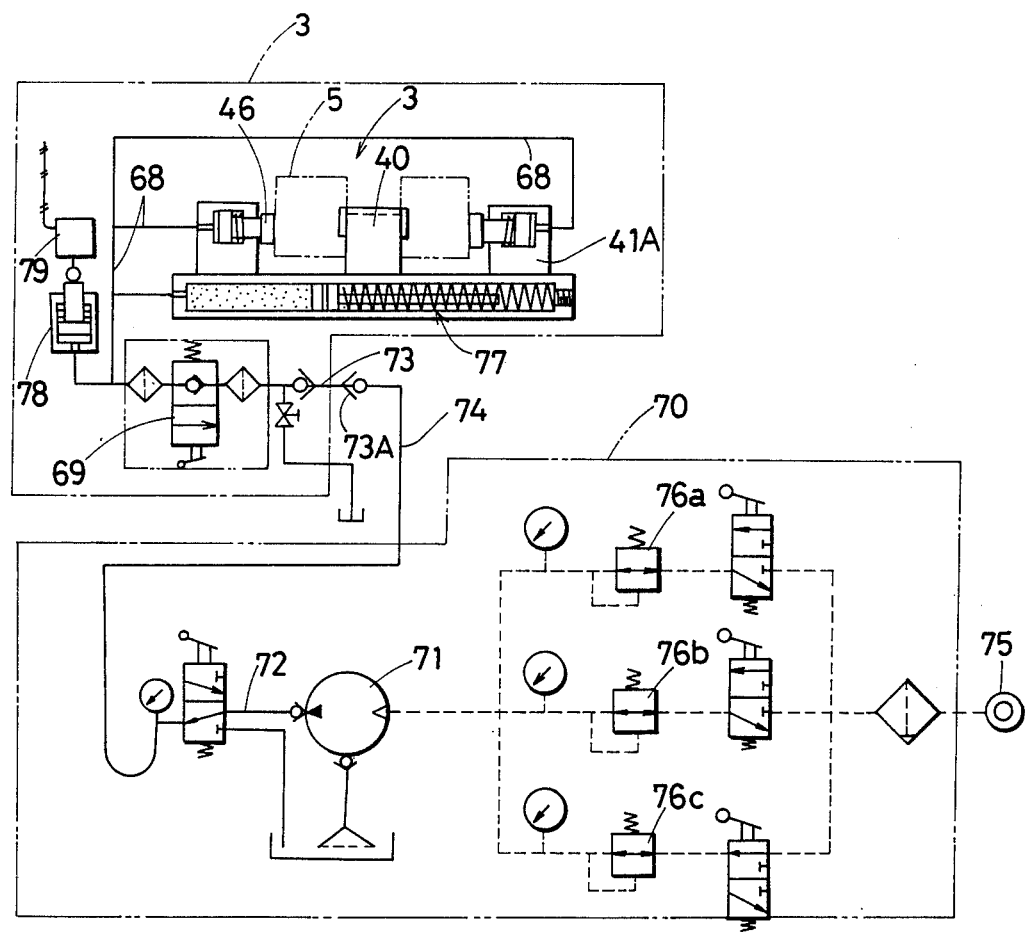

As shown in FIG. 18, the discharge port 72 of a hydraulic pump 71 of the hydraulic pressure supply device 70 is connectable to the hydraulic oil inlet-outlet port 73 of the work-clamp pallet 3 by means of an hydraulic hose 74.

The said hydraulic oil inlet-outlet port 73 is formed as a joint of self-seal coupling 73A type, and a non-leak reversible shut-off valve 69 is installed in the oil path 68 downstream of the said hydraulic oil inlet-outlet port 73 so that the oil path 68 is switchable between feeding and draining.

This shut-off valve 69 has built in it a check valve so as to be capable of perfectly shutting down the hydraulic oil flow.

The hydraulic pressure supply device 70 reduces the pneumatic pressure from an air source 75 alternatively by one of its three reducing valves 76a, 76b and 76c of different pressure levels and the reduced pneumatic pressure is supplied to the hydraulic pump 71 for a hydraulic pressure (of e.g. 50, 100 or 250 kg/cm$^2$G) corresponding to the said pneumatic pressure to be generated. This is for properly adjusting the clamping force of the clamping device 41 according to the material, shape and construction of the workpiece 5.

By this it is also possible to first tentatively clamp the workpiece 5 by supplying a relatively low hydraulic pressure to the clamping devices 41 for precise positioning of each workpiece 5, and then to clamp up each workpiece 5 by switching to a higher hydraulic pressure.

A single unit of reducing valve of variable type or a regulator may as well be used instead of the said reducing valves 76a, 76b and 76c.

Then, the self-seal coupling 73A is detached and the work-clamp pallet 3 is transferred onto the auxiliary table 4A to be clamped thereon.

To ensure against the decline of the hydraulic pressure in the hydraulic pressure system of the work-clamp pallet 3, there is provided a spring-loaded accumulator 77 in the base block 20 as well as an actuator 78 for detection of any abnormal decline of the hydraulic pressure. In the event of any abnormal decline of the hydraulic pressure, it is detected by a limit switch 79 on the table 4 which is triggered thereby.

This arrangement is aimed at precluding fluctuation of the hydraulic pressure by means of the spring-loaded accumulator, which fluctuation is possibly caused by rise or fall of the temperature of the hydraulic oil and the resulting expansion or contraction thereof in the course of time between clamping of the workpiece 5 and completion of the machining thereof.

Besides the said hydraulic oil supply means, there are a number of convenient means that can be adopted.

For instance, it is also possible to provide the work-clamp pallet 3 with a small hydraulic pump and an oil tank of a matching capacity, or alternatively with a small booster. Also it is possible to use a motor-driven hydraulic pump as a component of the hydraulic pressure supply device 70 of the pallet changing table 2 instead of the said pneumatically-driven hydraulic pump.

Further, when the clamping unit proper 41a of each clamping device 41 is provided independently, it is naturally necessary to supply the hydraulic pressure to each clamping device 41 independently and this inevitably result in a complicated composition of the oil path 68.

Referring to FIGS. 20–28, described below in detail are the various jigs used in connection with the present invention.

As seen from FIG. 20, vertical stopper engaging grooves 48a are provided at one end of each unit work positioning face 44a of the standard frame 40b for disengageably engaging a U-shaped positioning stopper 47a.

Figure 22:
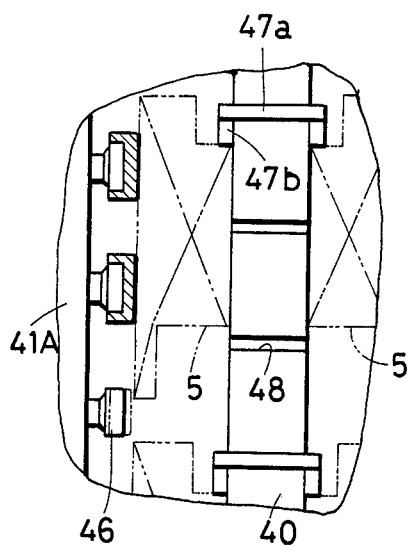

As shown in FIGS. 21 and 22, it is possible to attach to each work positioning face 47a of the U-shaped positioning stopper an auxiliary positioning stopper 47b so as to enable proper adjustment of the position of the work 5 along the X-axis.

As shown in FIG. 23, it is also possible to insert positioning stoppers 47c in mating through holes 48b provided horizontally one above the other in the standard frame 40c on the border between two adjacent unit work positioning faces 44a with end portions thereof projecting with their sides to serve as work positioning faces 47A.

Figure 24:
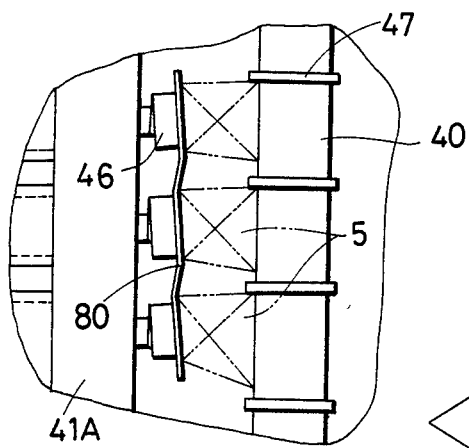

As shown in FIG. 24, it is further possible to insert a rotation checking plate 80 extending over a plurality of clamping blocks 46 between them and the workpieces 5. But for this rotation checking plate 80, the clamping blocks 46 are subject to rotation during machining to cause rotary displacement of the workpieces 5. Such rotary displacement can be prevented when the said rotation checking plate 80 is used, for, clamped at a plurality of points, it never rotates and thereby prevents rotation of the clamping blocks 46.

It is advisable to make this rotation checking plate 80 as a thin metal strip extending over the entire length of each clamp frame 41A.

Figure 25:
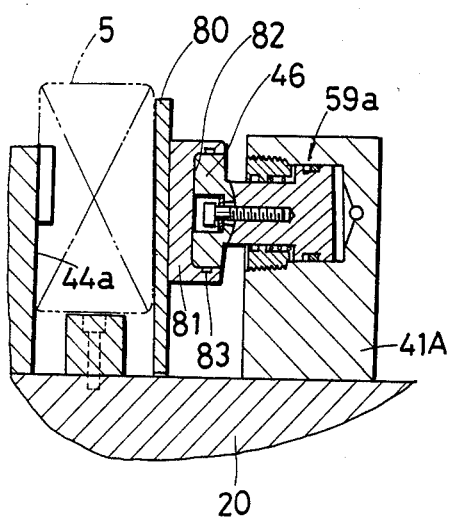

As shown in FIGS. 22 and 25, the stroke of the hydraulic cylinder 59a of the clamping device 41 is very limited, hence to make up for it and also to allow use of a larger clamping block 46 according to the size and shape of the workpiece 5 for effective clamping thereof, it is possible to demountably mount an auxiliary clamping block 81 on the clamping block 46 to clamp the workpiece 5 therewith.

In the embodiment shown, this auxiliary clamping block 81 is so designed that it can be easily mounted on the clamping block 46 by loosely inserting the latter in its mating recess 82 and, to ensure against its dropping off, there is provided an effective frictional locking means such as an "O" ring 83.

It is also possible to mount on said auxiliary clamping block 81 another, still larger auxiliary clamping block.

Figure 27:
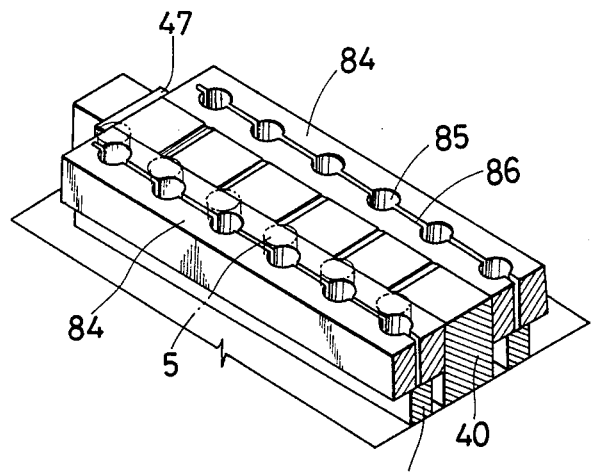
Figure 26:
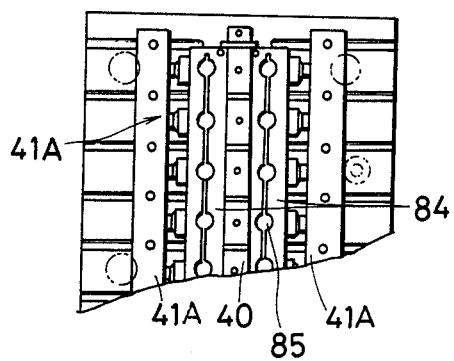

In the embodiment shown in FIGS. 26 and 27, a work retainer 84 for retaining cylindrical works 5 is disposed in each work-accommodating space 45 so as to facilitate setting of cylindrical works 5 in the work accommodating space 85.

When the work retainer 84 is clamped by the clamping device 41, a slit-like deformation compensation gap 86 is reduced for the cylindrical works 5 to be clamped over the retainer 84.

To said workpiece retainer 84 and the work 5 are set on a height adjuster 87 at the desired elevated level.

While it is necessary to change the work retainer 84 when larger workpieces 5 are to be clamped, but when the workpieces 5 to be clamped are smaller, each workpiece 5 may be set in a hollow cylinder of the corresponding size (not shown) before it is set in the work retainer 84 to be clamped over it.

Figure 28:
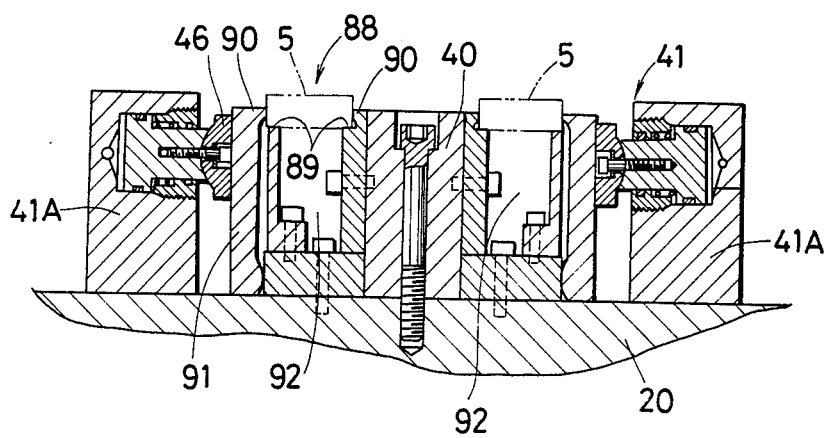
Figure 29:
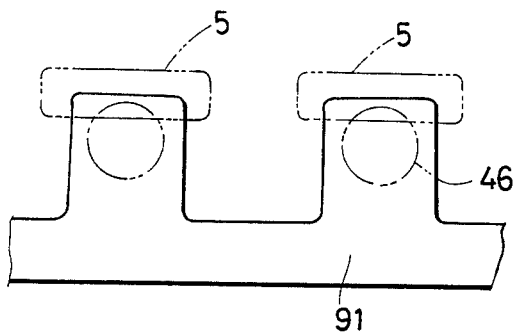

As shown in FIGS. 28 and 29, thin, flat workpieces 5 are to be clamped by the use of a flat work retainer 88.

It is so designed that the workpiece 5 is set on supporting faces 89 with its sides retained by retaining ends 90, one of which is held by the standard frame 40 and the other is pushed by the clamping block 46 of the clamping device 41. The workpiece 5 is clamped securely as one retaining block 90 is driven toward the other and at the same time the workpiece 5 is pushed downward lest it should lift by the downward component of the clamping force produced.

A space 92 provided under the workpiece 5 is preferred for it enables boring through the workpiece 5, also serving as chip collecting space.

The retaining block 91, whose upper end portion is the abovementioned retaining end, is formed continuous in the lower part and spaced in the upper part thereof so as to be better adaptable to various workpieces 5.

Described below are a number or partial modifications of the preferred embodiment described above.

Figure 30:
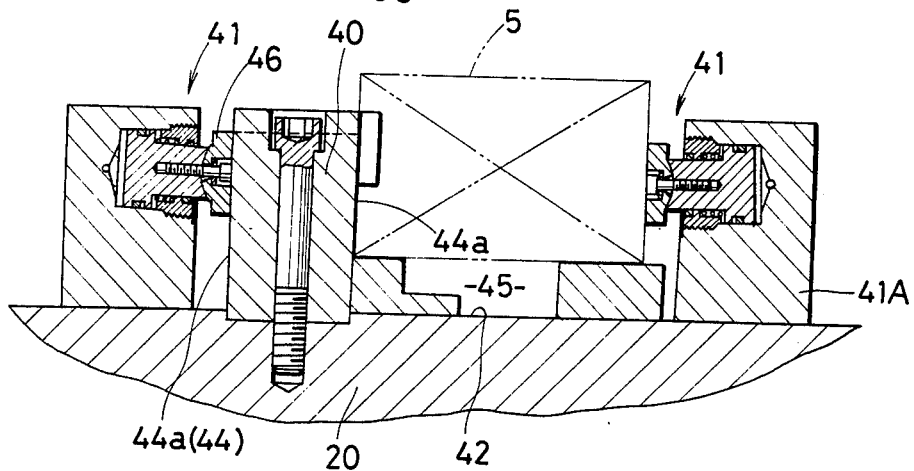
Figure 31:
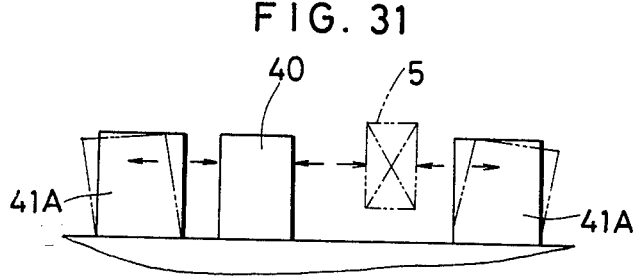
Figure 32:
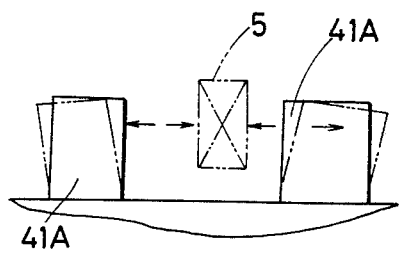

I. FIGS. 30–32 show a first modification.

When a large work 5 is to be clamped, the standard frame 40 is displaced longitudinally (along the Y axis), for instance, toward the rear edge of the work clamping face 42 of the base block 20, and the clamp frame 41A on the front side is set across an increased work accommodating space 45 from the standard frame 40, while the clamp frame 41A on the rear side is set close by the standard frame 40 without any work accommodating space 45 in between, both secured in place to the work clamping face 42. The clamping blocks 46 projecting out of the clamp frame 41A are then brought into contact with the opposing unit work positioning faces 44a of the standard frame 40 so that it is securely backed up against the clamping force applied to the work 5.

The works 5 arranged in front of the standard frame 40, these are then clamped by the clamping devices 41 in the front clamp frame 41A with the unit work positioning faces 44a of the standard frame 40 held by the rear row of the clamping devices 41 as mentioned above.

Since in this modification the standard frame 40 is backed up by the clamping device 41 in the rear row, it is symmetrically compressed from both front and back sides so that its deformation in the direction of the Y-axis is prevented and the position of the standard frame 40 with respect to the coordinate system for the work clamping face 42 is properly maintained. (See FIG. 31.)

If the standard frame 40 is not backed up by the clamping devices 41 in the rear row as shown in FIG. 32, the standard frame 40 may be deformed rearward and with resultant change of the position of each workpiece 5.

Figure 33:
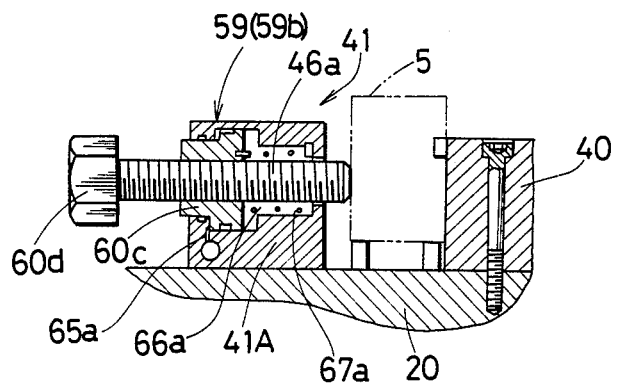

II. FIG. 33 is given to show a second modification.

In this modification the clamping means 59 of the clamping device 41 consists of a single-acting hydraulic cylinder of spring restitution type 59b, a clamping member 46a is set through a mating bore of a piston 60c as its output member and a manipulating means 60d is provided at the other end of the clamping member 46a.

The piston 60c is urged by a compression spring 67a loaded in a return-stroke chamber 66a toward the clamp relieving side and is restrained by the spring 67a lest it should rotate.

When the workpiece 5 is to be clamped on the work-clamp pallet 3, it is so designed that the manipulating means 60d is manipulated manually for tentatively clamping and positioning the workpiece 5 and then hydraulic oil is introduced into the forward stroke oil chamber 65a for clamping by the hydraulic pressure.

The clamping device 41 in this modification is capable of clamping wide as well as narrow workpieces 5 and also features a very small stroke of the hydraulic cylinder 59b.

The said clamping means 59 can as well be used as a clamping means consisting of a screw-type clamping member 46a without supplying hydraulic oil to the hydraulic cylinder 59b. In that case, however, more powerful restraining of the piston 60c against rotation is required.

Figure 34:
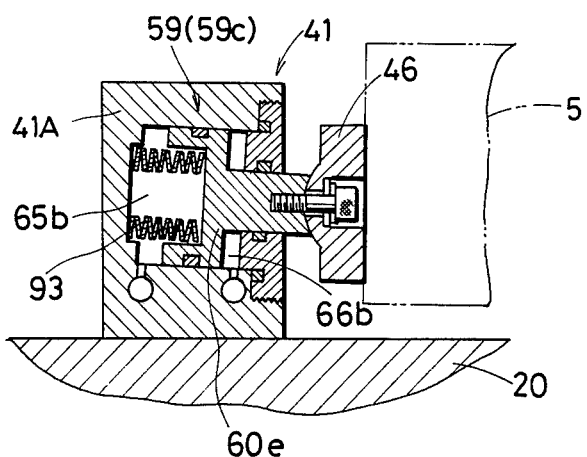

III. A third modification is shown in FIG. 34.

In this modification a piston 60e of the clamping means 59 of the clamping device 41 is urged toward the clamping side by a coned compression disc spring 93 set in a forward stroke oil chamber 65b of a double-acting hydraulic cylinder 59c.

The spring force of the said coned compression disc spring 93 is made as strong as, for instance, 500–1,000 kgf so that this spring force can be used for tentative clamping of the workpiece 5 and together with the hydraulic force also for clamping up of the workpiece 5.

So, when the workpieces 5 are to be set at the work changing station X on the pallet changing table 2, it is possible in this modification to bring the clamping block 46 into contact with the workpiece 5, with the hydraulic pressure supplied to the return stroke oil room 66b to cause the piston 60e to retract, and then disconnect the work-clamp pallet 3 from the said hydraulic pressure supply device 70 to release the hydraulic pressure for tentative clamping of the workpiece 5 to be made by the force of the coned disc spring 93.

After proper positioning of the workpiece 5 in said state of tentative clamping, the work-clamp pallet 3 is transferred onto the auxiliary table 4A of the machine tool 1 to be clamped thereon. Then the hydraulic hose from the hydraulic pressure supply device (not shown) on the machine tool 1 side is connected to the hydraulic oil inlet/outlet port (which communicates with the forward stroke oil room 65b of the hydraulic cylinder 59c) and a hydraulic pressure of e.g. 250 kg/cm$^2$G is supplied to the forward stroke oil room 65b of the hydraulic cylinder 59c for clamping up of the work 5.

It is then also possible to properly set the clamping force in the said procedure of tentative clamping through adjustment of the hydraulic pressure supplied to the return stroke oil room 66b.

When said clamping device 41 is used, the work-clamp pallet 3 can be transferred with the hydraulic hose disconnected without providing it with said non-leak shut-off valve of reversible type 69 (FIG. 18) and, moreover, since it is reconnected to the hydraulic pressure supply device after it has been clamped on the auxiliary table 4A, there is no risk of any trouble such as hydraulic pressure leakage or abnormal fall of hydraulic pressure.

Figure 35:
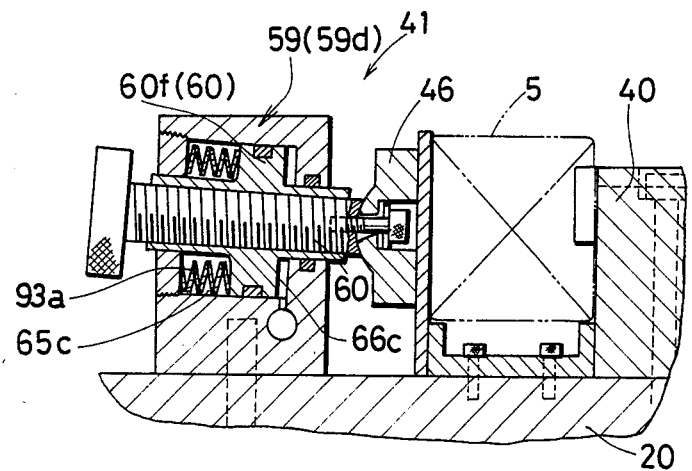

IV. FIG. 35 shows a fourth modification.

The clamping device 41 in this modification uses spring force alone for clamping and hydraulic force for unclamping.

For that a powerful coned compression disc spring 93a is set in a forward stroke chamber 65c of a hydraulic cylinder 59d of the clamping means 59 to urge a piston 60f toward the clamping side.

When workpieces 5 are set at the work changing station X, the clamping blocks 46 are applied to the workpieces with hydraulic pressure supplied to a return stroke oil chamber 66c to compress the coned disc spring 93a as in the case of the third modification above, and then the hydraulic pressure is released for the workpieces 5 to be powerfully clamped by the force of the coned disc spring 93a. Then, the work-clamp pallet 3 is transferred onto the auxiliary table 4A of the machine tool 1 and clamped thereon for the workpieces 5 to be machined in the total absence of hydraulic pressure.

Figure 36:
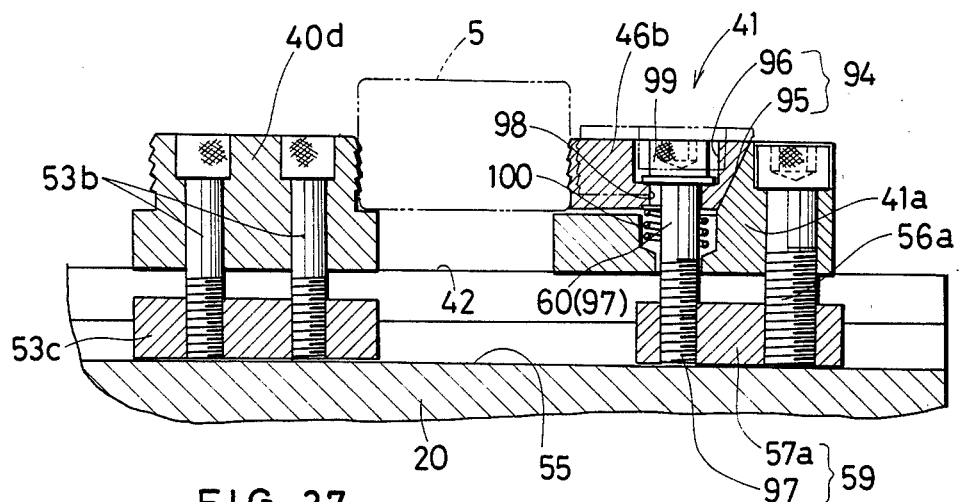

V. A fifth modification is shown in FIG. 36.

The clamping device 41 in this modification is of the so-called slide wedge type in which a clamping block 46b is operated manually over a power-multiplying mechanism 94 for clamping to be accomplished thereby.

A standard frame 40d is secured to the work clamping face 42 with its position freely adjustable by screwing its two clamping bolts 53b into mating T nut 53c disposed in the T-sectioned groove 55 in the base block 20.

The independent clamping unit proper 41a of each clamping device 41, too, is secured in place as its fixing bolt 56a is screwed into a mating T-nut 57a. It is, however, as well possible to form them as a linked clamping system in the form of a clamp frame as in the case of the said preferred embodiment.

A clamping bolt 97 as output member 60 of the clamping means 59 is set loosely through a mating hole 98 in a clamping block 46b with its head 99 checked by the clamping block 46b and its lower end portion screwed into a T-nut 57a.

An inclined cam face 96 of the clamping block 46b is brought into plane contact with a mating inclined cam face 95 of the clamping unit proper 41a by the action of a spring 100 and it is so arranged that the clamping block 46b is driven toward or away from the standard frame 40a by means of a clamping bolt 97 with the power-multiplying mechanism 94 made up of said two mating faces.

The said spring 100 is set with its upper end displaced horizontally toward the standard frame 40d side so that its restitutional force acts to urge the clamping block 46b toward the inclined cam face 95.

The said clamping bolt 97 serves to effect driving the clamping block 46b by pulling up the T-nut 57a, at the same time fixing the clamping unit proper 41a.

Figure 37:
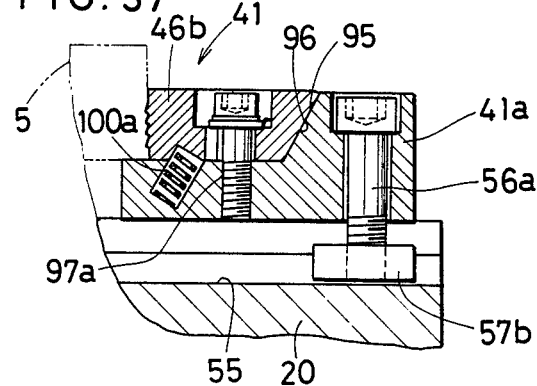

VI. A sixth modification is shown in FIG. 37.

The clamping device 41 in this modification is a further partly modified one of the fifth modification described above.

The clamping unit proper 41a is secured by the fixing bolt 56a alone and the threaded part of a clamping bolt 97a of the clamping means 59 is screwed into a clamping unit proper 41a. A compression spring 100a is used to urge the clamping block 46b toward the inclined cam face 95.

The clamping devices 41 shown in the fifth and sixth modifications are of the type in which each clamping device is driven manually to effect clamping, hence they are particularly suited for box-shaped work-clamp pallets intended for horizontal machine tools.

Figure 38:
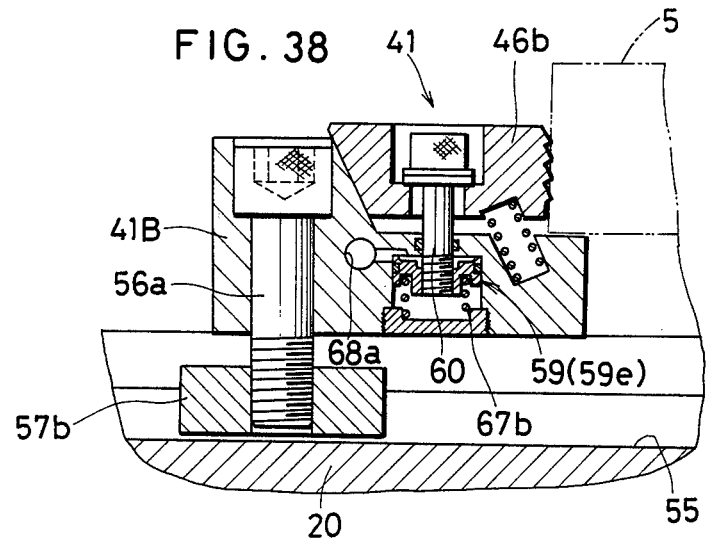

VII. Shown in FIG. 38 is a seventh modification.

The clamping device 41 in this modification is different from that of the sixth modification above in that a hydraulic cylinder 59e is used as clamping means 59.

It is so arranged to drive the clamping block 46b by the output member 60 of the vertical hydraulic cylinder 59e built in a continuous clamp frame 41B formed as the clamping unit proper. Reference numeral 68a denotes an oil path and 67b a restitution spring.

Figure 39:
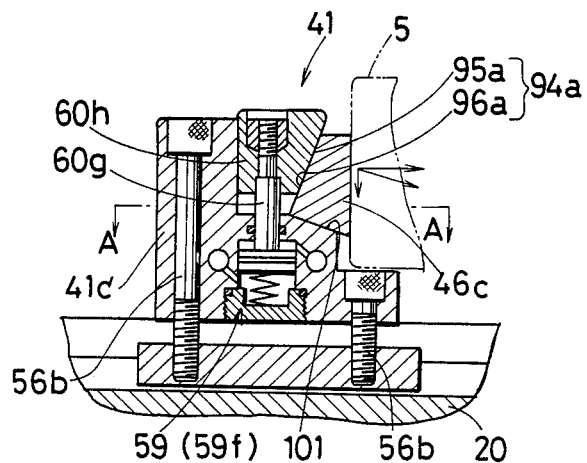
Figure 40:
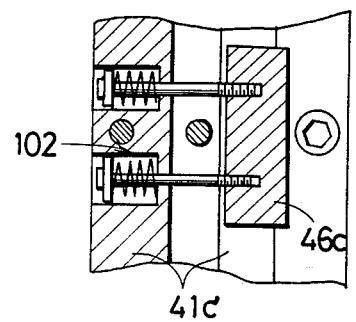

VII. FIGS. 39 and 40 are given to show a eighth modification.

The clamping device 41 in this modification is similar to the one described in the seventh modification above. In it a continuous clamp frame 41C is secured by two fixing bolts 56b, and a hydraulic cylinder 59f as the clamping means 59 works to drive the first output member 60g and the second output member 60h downwardly so that a clamping block 46c is driven toward the standard frame by a power-multiplying mechanism 94a consisting of an inclined cam face 95a and an inclined driven face 96a.

Since the clamping block 46c is driven to slide on the inclined bearing face 101, there is produced also a downward component which acts pushing down the workpieces 5.

As shown in FIG. 40, the clamping block 46c is urged by a pair of pulling means 102 toward the second output member 60b, but it may as well be engaged with the second output member 60b by means of a dovetail groove.

This modified clamping device 41, in which every sliding part is in contact without any gap, is safe from ingression of chips and is excellent in durability.

Figure 41:
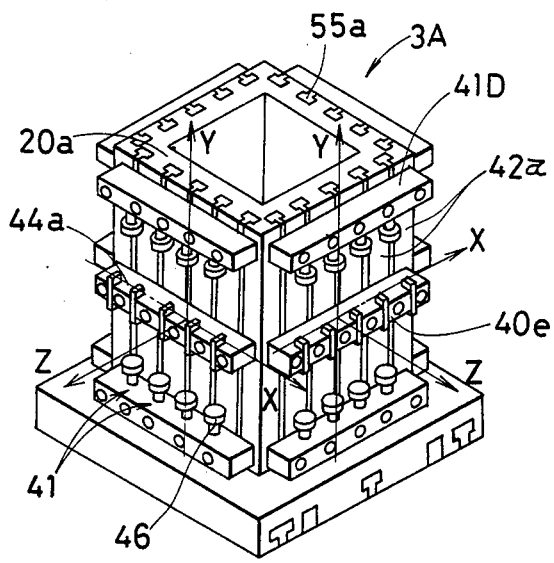
Figure 42:
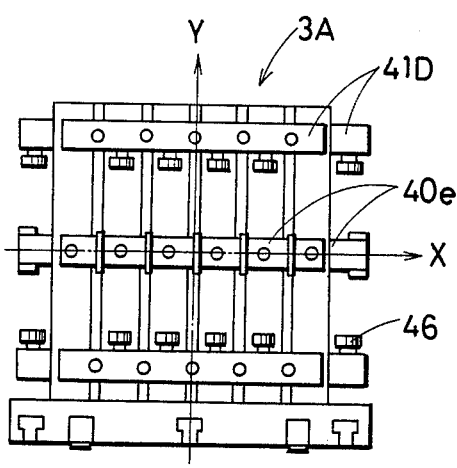
Figure 43:
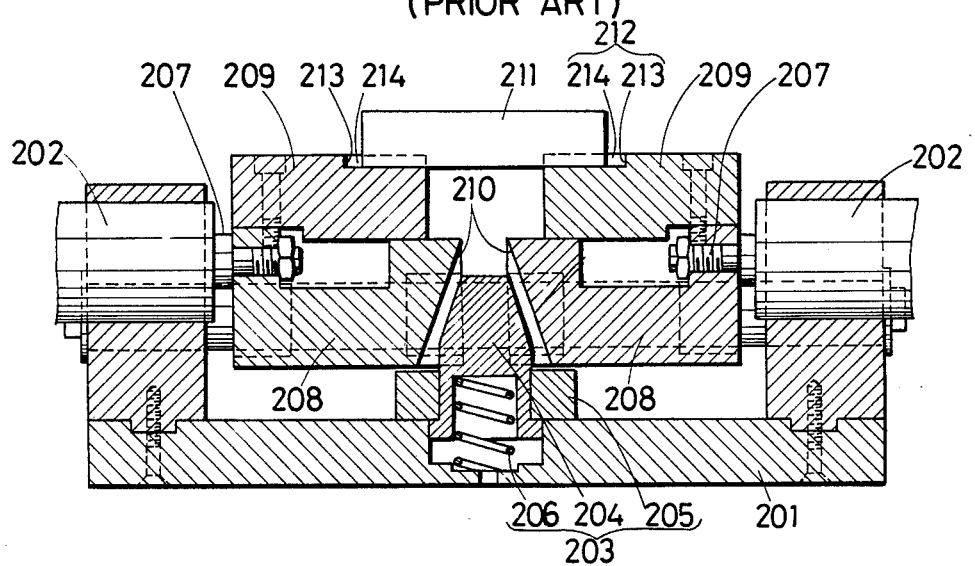
FIG. 43 is given to show the quoted prior art.

IX. A ninth modification is shown in FIGS. 41 and 42.

A work-clamp pallet 3A in this modification is a box-shaped one intended for horizontal machine tools. Its base block 20a is a box-like rectangular parallelepiped body made of steel with work clamping faces 42a formed on the four sides thereof.

With the center of each work clamping face 42a as the point of origin the X, Y and Z axes are set as illustrated. On each work clamping face 42a there is secured a standard frame 40e along the X-axis with its position freely adjustable in the direction of Y-axis and on both sides thereof and parallel thereto one upper and one lower clamp frame 41D are secured with their positions again freely adjustable.

Each clamp frame 41D has provided therein 4 sets of hydraulic clamping device 41, each with a clamping block 46 for claming the work 5 against the corresponding unit work positioning face 44a.

With the standard frame 40e and the clamp frames 41D all removed, larger works can be clamped by screwing bolts etc. into T-nuts disposed in a T-sectioned groove 55a.

As the clamping device 41 it is also possible to use those of the slide wedge type in the fifth to seventh modifications described above, especially preferred being those of the manual type.

What is claimed is:

1. A pallet for clamping a plurality of workpieces on a vertical machine tool comprising:
    (a) a base block of generally rectangular shape and having X and Y axes and an upper workpiece mounting surface;
    (b) means to attach the base block to the bed of the machine tool in a fixed, pre-determined position;
    (c) a standard frame attached to an upper surface of the base block and extending generally parallel to the X axis, the standard frame having a pair of oppositely facing work positioning faces;
    (d) a plurality of positioning stoppers removably attached to the standard frame so as to define a plurality of work clamping stations along the length of the standard frame; and,
    (e) clamping means disposed on both sides of the standard frame, each clamping means comprising:
        (i) a clamp frame attached to the upper surface of the base block so as to extend generally parallel to the standard frame, the clamp frame defining a plurality of hydraulic cylinder chamber, each hydraulic cylinder chamber extending generally parallel to the Y-axis, and further defining a hydraulic oil path connecting to each hydraulic cylinder chamber;
        (ii) adjustable attaching means to attach the clamp frame to the base block such that the position of the clamp frame is adjustable in a direction generally parallel to the Y-axis; and,
        (iii) a plurality of hydraulic cylinder clamping devices, each device slidably mounted in a hydraulic cylinder chamber of the clamp frame so as to be aligned with each work clamping station, the clamping devices each exerting a clamping force generally parallel to the Y axis so as to clamp a workpiece between the clamping device and a work positioning face of the standard frame.

2. A work-clamp pallet according to claim 1, further comprising: means to drive an output member of said clamping device forward and back along the Y-axis; and, a clamping block connected thereto.

3. A work-clamp pallet according to claim 1 further comprising: means to drive an output member of said clamping device along a Z-axis perpendicular to the X-Y plane; and means to convert this motion to motion in a plane parallel to the X-Y plane comprising an inclined cam face on the clamping device and a mating inclined cam face on the clamping frame.

4. A work-clamp pallet according to claim 1, wherein said hydraulic cylinder clamping device further comprises spring biasing means.

5. A work-clamp pallet according to claim 4, wherein said hydraulic cylinder clamping device is a single-acting hydraulic cylinder of the spring restitution type.

6. A work-clamp pallet according to claim 4, wherein said hydraulic cylinder clamping device is a double-acting hydraulic cylinder-with-spring having a compression spring located in a forward stroke oil chamber.

7. A work-clamp pallet according to claim 1, wherein an output member of the hydraulic cylinder clamping device has a clamping block screwed therethrough, which clamping block is provided with a manipulating means.

8. A work-clamp pallet according to claim 2, wherein said clamping block has a partially spherical contact face in contact with a mating spherical seat of said output member so as to permit oscillation of said clamping block.

9. A work-clamp pallet according to claim 2, wherein an auxiliary clamping block is demountably attached on said clamping block.

10. A work-clamp pallet according to claim 2, wherein a longitudinal axis of said output member is inclined downwardly toward its distal end with respect to said work clamping face.

11. The work-clamp pallet according to claim 1 wherein the adjustable attaching means enables the clamping device to exert a back-up clamping force directly against the work positioning face of the standard frame.

12. The work-clamp pallet according to claim 1 wherein the base block defines a plurality of grooves on an underside, each groove having a T-shaped cross-section and extending generally parallel to the Y-axis and wherein the means to attach the base block to the machine bed comprises second clamping devices attached to the machine bed, each second clamping device having means to engage the T-shaped grooves to retain the base block in position.

13. The work-clamp pallet according to claim 1 further comprising:
 (a) rail means attached to the bed of the machine tool; and,
 (b) castor means attached to an underside of the base block, the castor means engaging the rail means to enable the base block to move in a direction generally parallel to the Y-axis to facilitate placement and removal of the base block from the machine bed.

14. The work-clamp pallet according to claim 1 wherein the upper surface of the base block defines a groove extending generally parallel to the X-axis and wherein the standard frame is located in the groove.

15. The work-clamp pallet according to claim 1 wherein the standard frame is removably attached to the base block.

16. The work-clamp pallet according to claim 1 wherein each positioning stopper is generally U-shaped.

17. The work-clamp pallet according to claim 16 wherein the standard frame defines a plurality of recesses on an upper surface and the U-shaped positioning stoppers are attached thereto such that the base of the U rests in the grooves.

18. The work-clamp pallet according to claim 17 further comprising auxiliary positioning stoppers attached to the legs of the U-shaped positioning extending in a direction generally parallel to the X-axis to position the workpiece in this direction.

19. The work-clamp pallet according to claim 1 further comprising actuating means to actuate the clamping devices simultaneously as a unit.

20. A work-clamp pallet according to claim 19, wherein a push-pull means for displacing said clamping frame forward and back along the Y-axis is provided between said clamping frame and said base block.

* * * * *